United States Patent
Zhang et al.

(10) Patent No.: US 9,206,659 B2
(45) Date of Patent: Dec. 8, 2015

(54) APPLICATIONS OF SMART FLUIDS IN WELL SERVICE OPERATIONS

(75) Inventors: Kewei Zhang, Calgary (CA); Scott Sherman, Blackie (CA)

(73) Assignee: TRICAN WELL SERVICE LTD., Alberta (CA)

( * ) Notice: Subject to any disclaimer, the term of this patent is extended or adjusted under 35 U.S.C. 154(b) by 720 days.

(21) Appl. No.: 13/021,698

(22) Filed: Feb. 4, 2011

(65) Prior Publication Data

US 2011/0186297 A1    Aug. 4, 2011

(30) Foreign Application Priority Data

Feb. 4, 2010    (CA) ................................ 2691891

(51) Int. Cl.
*E21B 43/26* (2006.01)
*E21B 21/00* (2006.01)
*C09K 8/70* (2006.01)

(52) U.S. Cl.
CPC ............... *E21B 21/003* (2013.01); *C09K 8/70* (2013.01); *E21B 43/261* (2013.01)

(58) Field of Classification Search
None
See application file for complete search history.

(56) References Cited

U.S. PATENT DOCUMENTS

| | | | | |
|---|---|---|---|---|
| 3,377,549 A | * | 4/1968 | Arnerich et al. | 324/342 |
| 4,532,052 A | * | 7/1985 | Weaver et al. | 507/222 |
| 4,579,173 A | * | 4/1986 | Rosensweig et al. | 166/248 |
| 4,802,534 A | * | 2/1989 | Larson et al. | 166/381 |
| 4,941,533 A | * | 7/1990 | Buller et al. | 166/270 |
| 5,238,067 A | * | 8/1993 | Jennings, Jr. | 166/307 |
| 5,295,393 A | * | 3/1994 | Thiercelin | 73/152.51 |
| 5,671,809 A | * | 9/1997 | McKinzie | 166/285 |
| 6,047,773 A | * | 4/2000 | Zeltmann et al. | 166/281 |
| 6,367,548 B1 | * | 4/2002 | Purvis et al. | 166/281 |
| 6,719,055 B2 | * | 4/2004 | Mese et al. | 166/308.1 |
| 6,926,089 B2 | * | 8/2005 | Goodson et al. | 166/387 |
| 7,032,670 B2 | * | 4/2006 | Zitha | 166/305.1 |
| 2003/0166470 A1 | * | 9/2003 | Fripp et al. | 507/100 |
| 2003/0192687 A1 | * | 10/2003 | Goodson et al. | 166/65.1 |
| 2005/0065041 A1 | * | 3/2005 | Hill | 507/271 |
| 2005/0109512 A1 | * | 5/2005 | Zitha | 166/305.1 |
| 2006/0175059 A1 | * | 8/2006 | Sinclair et al. | 166/283 |
| 2007/0074869 A1 | * | 4/2007 | Svoboda | 166/294 |
| 2007/0234788 A1 | * | 10/2007 | Glasbergen et al. | 73/152.12 |
| 2009/0211751 A1 | * | 8/2009 | Ocalan et al. | 166/248 |

OTHER PUBLICATIONS

Bailey et al.; Water Control; Spring 2000; Oilfield Review, pp. 30-51.*

* cited by examiner

*Primary Examiner* — Doug Hutton, Jr.
*Assistant Examiner* — Anuradha Ahuja
(74) *Attorney, Agent, or Firm* — Bradley Arant Boult Cummings LLP

(57) ABSTRACT

Compositions, apparatuses and methods for isolating target zones for hydraulic fracturing, in particular, the use of smart fluids (i.e., magnetorheological fluids) to isolate target zones for fracturing by inducing an electromagnetic field to increase the viscosity of the fluids to form packers or plugs in the annulus of the wellbore and to isolate the target zone are disclosed.

13 Claims, 8 Drawing Sheets

APPLICATIONS OF SMART FLUIDS IN WELL SERVICE OPERATIONS

CROSS-REFERENCE TO RELATED APPLICATIONS

This application claims priority from Canadian Patent Application No.: 2,691,891 filed Feb. 4, 2010.

FIELD

This invention relates to smart fluid compositions and methods for well service operations.

BACKGROUND

Many wells are drilled in reservoirs that have multiple pay zones. To stimulate each zone effectively it is crucial that the stimulation fluid, for example, fracturing fluid, be diverted to the targeted zone. It is common to use mechanical isolation to help ensure effective stimulation of each zone or groups of closely spaced zones. Normally it involves the following steps:
1. Perforate the lowest zone, then perform the hydraulic fracture treatment;
2. Flowback the stimulated zone;
3. Mechanically isolate the stimulated zone and then repeat the processes of fracturing and flowback; (and possibly a third or more zones when needed); and
4. Finally, remove the mechanical isolation devices, and put the well on production.

Mechanical isolation methods are generally reliable for diverting multi-staged fracture treatments. However, extra work-over equipment is needed to set and remove the mechanical isolation devices in the well, thus, making such methods time consuming and expensive.

Another type of isolation method involves the use of sand plugs to isolate the treated zones. Such a method involves fracture treating the lowest zone, and then setting a sand plug across the lower zone to isolate the treated zone. The upper zone is then perforated and fracture treated. The process is repeated. Setting the sand plug is achieved by pumping sand slurry into the well and allowing sands to settle to the bottom. The permeability of the sand plug should be low enough to ensure that it would not allow the re-fracturing of the lower zone. The sand plug method is simple, less time consuming and economic. Unfortunately, this method is incapable of isolating zones in horizontal wells, as gravity pulls sands away from upper part of the well.

In recent years, drilling horizontal wells in combination with multi-staged fracturing has become a common practice, especially for tight formations including shale formations. In order to effectively fracture the targeted formation, zone isolation using mechanical means normally has to be applied in a horizontal well, despite the fact that it is time consuming and expensive.

SUMMARY OF THE INVENTION

In one aspect, the present invention relates to plugs comprising a viscosified smart fluid for zone isolation during well completion and hydraulic fracturing operations, as well as in other operations.

In another aspect, the present invention relates to smart fluid compositions and their use for diverting a fracturing fluid during multi-staged hydraulic fracturing operations.

In another aspect, the present invention relates to a smart fluid that is a magnetorheological ("MR") fluid. The MR fluid is used for diverting a fracturing fluid to a targeted zone in a multi-staged well service operation, including without limitation, an hydraulic fracturing operation in a well which can be vertical, horizontal or diverted.

In another aspect, the present invention relates to a method of diverting fracturing fluid to a targeted zone in a wellbore comprising flowing a smart fluid composition, such as the MR fluid, into the wellbore; inducing an electromagnetic field in the fluid sufficient to increase the viscosity of the smart fluid; flowing a fracturing fluid in the wellbore whereby fracturing fluid contacting the viscosified smart fluid is diverted to a targeted zone.

In another aspect, the present invention relates to a method of isolating a zone in a wellbore comprising providing a smart fluid in a wellbore; and inducing a magnetic field in the fluid; whereby the fluid is changed from a liquid state to a solid state thus isolating the zone.

In another aspect, the present invention relates to a well treatment method comprising providing a work string comprising a well treatment tool at an end of the string, the tool comprising an electromagnet; inserting the tool into a wellbore in a subterranean formation; injecting a smart fluid into the wellbore via the string; inducing a magnetic field with the electromagnet in the smart fluid in the wellbore; injecting a well treatment fluid into the wellbore at a pressure sufficient to fracture the formation.

In another aspect, the present invention relates to a well treatment apparatus comprising a tubular body closed at one end; connection means at another end for connection to a work string; a pair of spaced electromagnetic coils on the body connectable to an electrical source; whereby when electricity is conveyed to the coils, a magnetic field is induced.

In another aspect, the present invention relates to a wellbore casing comprising an electromagnetic coil in the casing.

DESCRIPTION OF THE INVENTION

Figure 1:
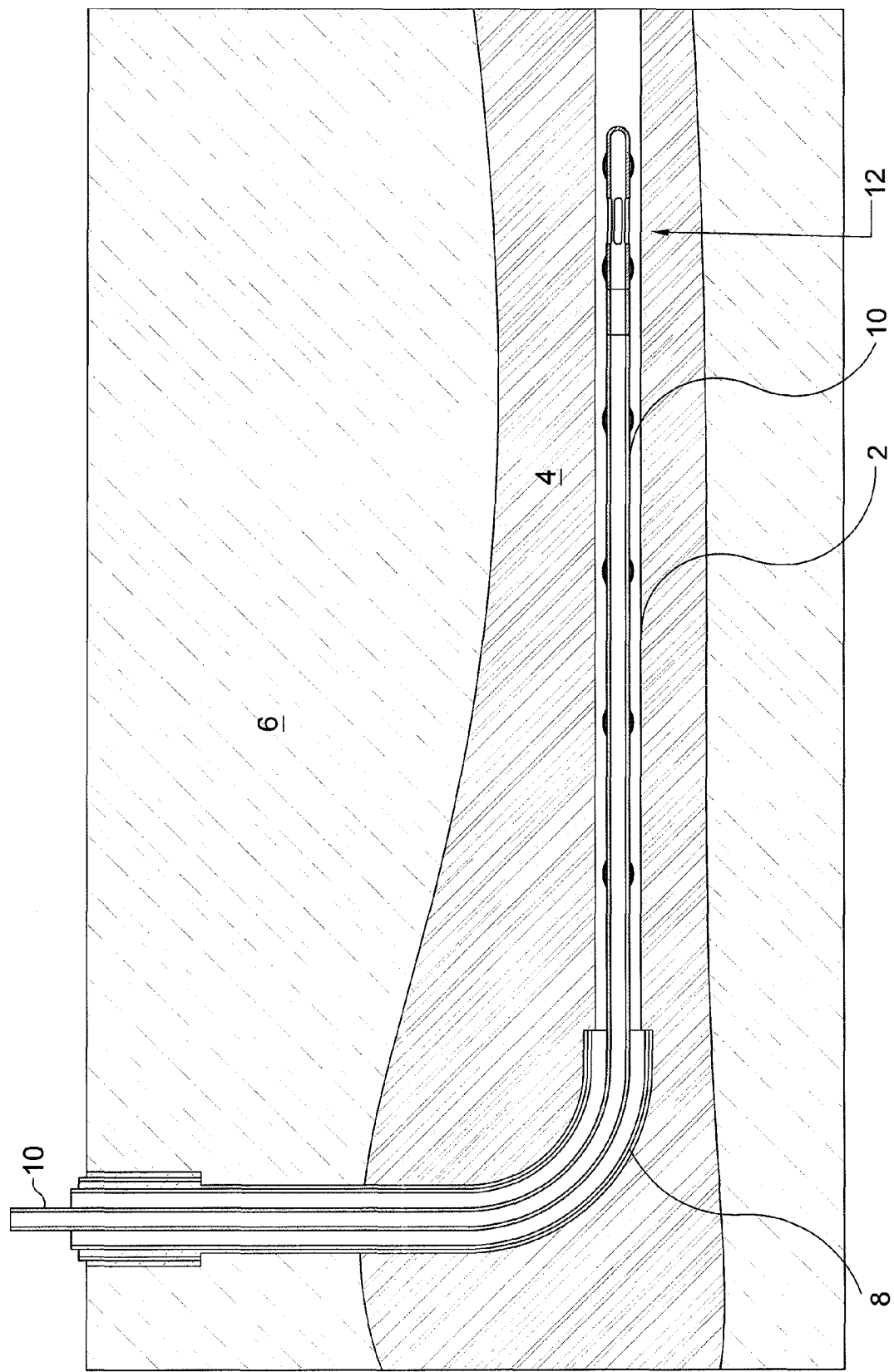
FIG. 1 is a schematic cross-section of one or more embodiments of an apparatus and method according to this invention.
Figure 2:
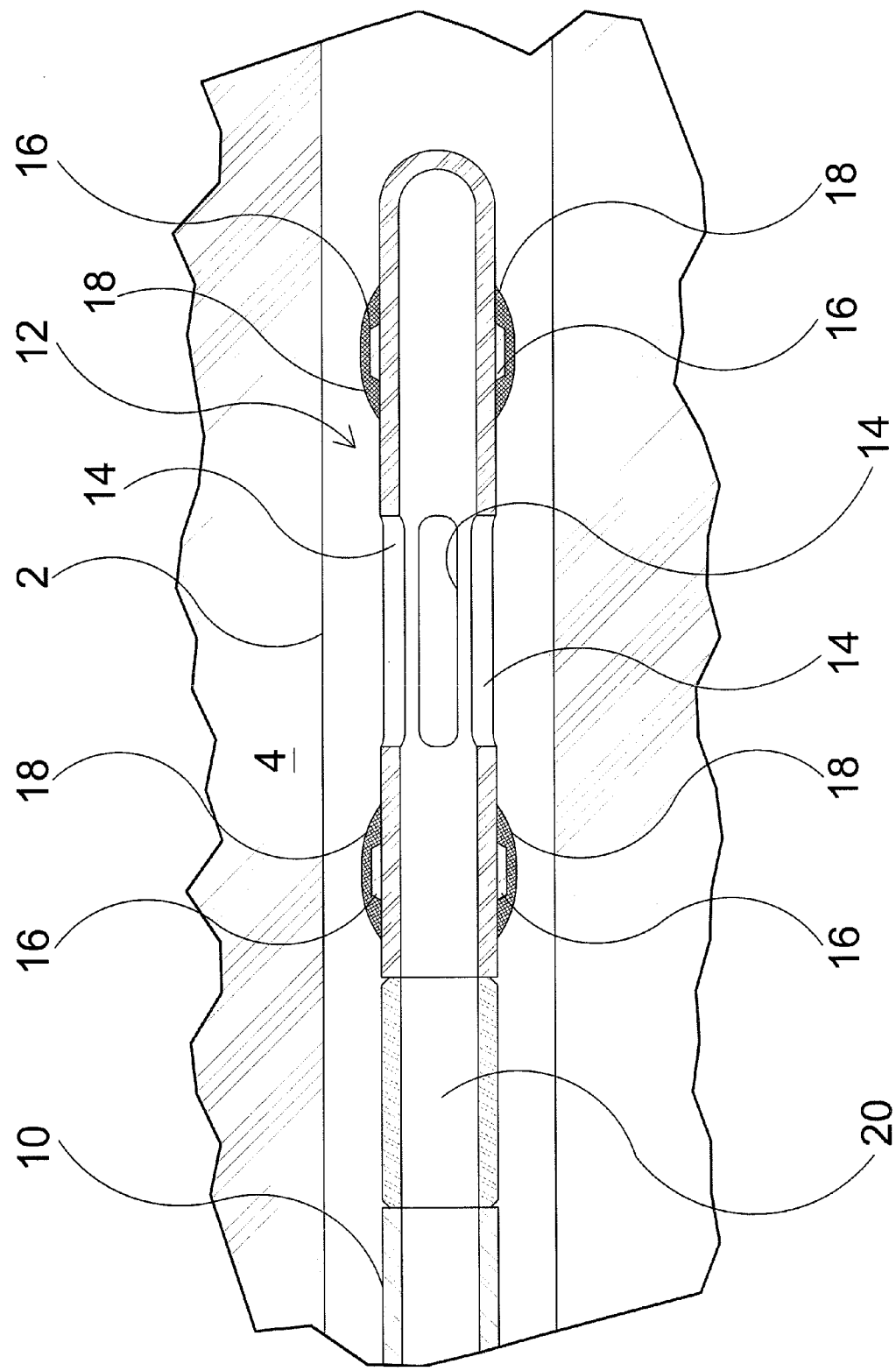
FIG. 2 is an enlarged diagram of tool 12 of FIG. 1.

In one aspect, the invention relates to use of a smart fluid to isolate a zone in a subterranean formation. The smart fluid in one or more embodiments is an MR fluid.

In another aspect, the invention relates to a method of isolating a zone in a wellbore comprising providing a smart fluid in a wellbore; and inducing a magnetic field in the fluid, whereby the fluid is changed from a liquid state to a semi-solid or solid state thus isolating the zone and/or forming a barrier for diverting a fracturing fluid to a targeted zone in a multi-staged well service operation, including without limitation, an hydraulic fracturing operation.

A smart fluid is a fluid whose properties, for example, the rheological property, changes dramatically in response to a magnetic field or an electric field. These fluids are able to change from free-flowing viscous liquids to semi-solids having controllable yield strength in milliseconds when exposed either a magnetic or an electric field. In the absence of a magnetic or electric field, smart fluids have low viscosity.

The most developed smart fluids today are magnetorheological ("MR") fluids whose viscosity increases significantly when a magnetic field is applied. A basic MR fluid normally comprises ferromagnetic particles, including without limitation, iron particles, suspended in a carrier liquid. The size of the iron particles is generally in the range of 0.1-10 μm. The carrier fluid is most commonly hydrocarbon oil, although MR fluids are also made using silicone oil, water or other suitable fluids for different applications. The concentration of the iron particles is typically in the range of 20%-40% by volume. Without being bound by theory, the magnetorheological response of MR fluids originates from the particle polarization induced in the magnetic field. The polarization causes the particles to line up, increasing the viscosity of the fluid dramatically. The force of magnetism can change both the shape and the viscosity of MR fluids. The hardening process occurs very fast, taking around twenty thousandths of a second. The magneto-rheological response of MR fluids can vary dramatically depending on the composition of the fluid and the size and shape of the particles, and the strength of the magnetic field. The MR fluids in accordance with one or more embodiments of this invention can also contain non-ferromagnetic particles, for example, silica particles, which can be either hydrophilic or hydrophobic treated, for example, using organic silicone compounds.

Another interesting characteristic of MR fluids is that their mechanical properties under the magnetic field are anisotropic, i.e., the largest resistance to the flow is in the direction perpendicular to the direction of magnetic field. These fluids, especially MR fluids, have been commercially used in various applications including fluid dampers and clutches.

In one or more embodiments of this invention, smart fluids are used to isolate zones in a wellbore as plugs during multi-staged fracturing treatment in horizontal wells. In one or more embodiments of this invention, a work string, including, without limitation, jointed tubing or coiled tubing, is run into a wellbore to a depth where the first fracturing treatment is to be initiated. In a vertical well, this normally is at the wellbore nearest the bottom of the well. In a horizontal well, this normally is at the wellbore nearest the toe of the well. A smart fluid, such as a MR fluid, is pumped into the wellbore. At the same time or after a magnetic field is induced in the MR fluid in the direction perpendicular to the wellbore turning the MR fluid to a solid state whereby it acts as an effective barrier to fluid in the longitudinal direction along the wellbore, a fracturing fluid is pumped at a pressure sufficient to initiate the first fracturing treatment.

The locations of the magnetic field are adjusted according to the locations of the targeted zones. A magnetic field can be induced in a MR fluid using conventional methods and equipment. For example, electromagnetic coils can be wound on the work string. When an electric current runs through the electromagnetic coils, a magnetic field is generated in the desirable locations. After the first fracturing treatment, the magnetic field is turned off and the MR fluid returns to a liquid state and the coiled tubing is moved to the next fracturing location and the same fracturing process is repeated.

In one or more embodiments of this invention, the gel plugs and the methods of using them as disclosed in Canadian Patent Application 2,679,948 can be combined with the smart fluids. The gel can first fill up part of the wellbore followed by a smart fluid and then another gel plug. The sequence can be repeated few times. The same fracturing procedures as indicated above can be applied. Both aqueous-based and oil-based gels can be used.

In one or more embodiments of this invention, the surface of iron particles used in the smart fluid can be treated to change their wettability toward the carrier fluid. For example, compounds including polysiloxanes and fluorosilanes or fluorosiloxanes can be applied to the surfaces of the iron particles. The alteration of the wettability of the particles may affect the rheological properties of the MR fluid in either "on" (i.e. magnetized) or "off" (non-magnetized) states.

In one or more embodiments, a smart fluid according to this invention can be gelled to enhance its viscoelastic property. In the case where an oil-based smart fluid is used, for example, a phosphate ester with a metal cross-linker or a metal carboxylate can be used to gel the smart fluid. In case where an aqueous-based MR fluid is used, gellants including water-soluble polymers and viscoelastic surfactants can be used to gel the MR fluid. These gellants are known to people skilled in the art.

In one or more embodiments of this invention, an MR fluid according to this invention is contained in a soft shell container, for example, a ring made of soft or flexible materials including fibres, soft rubber or flexible plastic, which can be placed or wound around a work string which could be jointed pipe or coil tubing for example. In the absence of a magnetic field, the work string enters into the wellbore easily. Under a magnetic field during a fracturing operation, the MR fluid changes to a solid state sealing up the annular space between the coiled tubing and the casing or the space between the work string and the formation as in an open hole application, and isolate the targeted zone from the surround zones.

Referring initially to FIG. 1, in one or more embodiments of this invention, a horizontal well 2 is drilled in a hydrocarbon bearing zone 4 in formation 6. The initial section of the well 2 is cased with a conventional casing 8. The rest of the well 2 is uncased. A coiled tubing string 10 is run into the well. It will be understood by those skilled in the art that other types of work strings may be used in place of coiled tubing, including but not limited to jointed pipe.

An electromagnetic fracturing tool indicated generally at 12 is connected on the end of coiled tubing 10. Slots 14 are provided in the tool 12 for permitting fluid, such as but not limited to a fracturing fluid, to pass from inside the coiled tubing 10 into the wellbore 2. The tool 12 is provided with a pair of first and second electromagnetic coils 16 which encircle the tool 12. The coils 16 are operably connected to a downhole power generator 25 which provides electricity to energize the coils 16. A convention downhole power generator such as disclosed in U.S. Pat. No. 6,191,561 can be used. Alternatively, other power sources can be used such as, but limited to, running power cables by wireline, to the tool 12 from a surface generator (not shown).

The coils 16 in turn are each encircled by a malleable ring 18 containing a magnetorheological fluid 20 comprising iron particles according to this invention.

Figure 3:
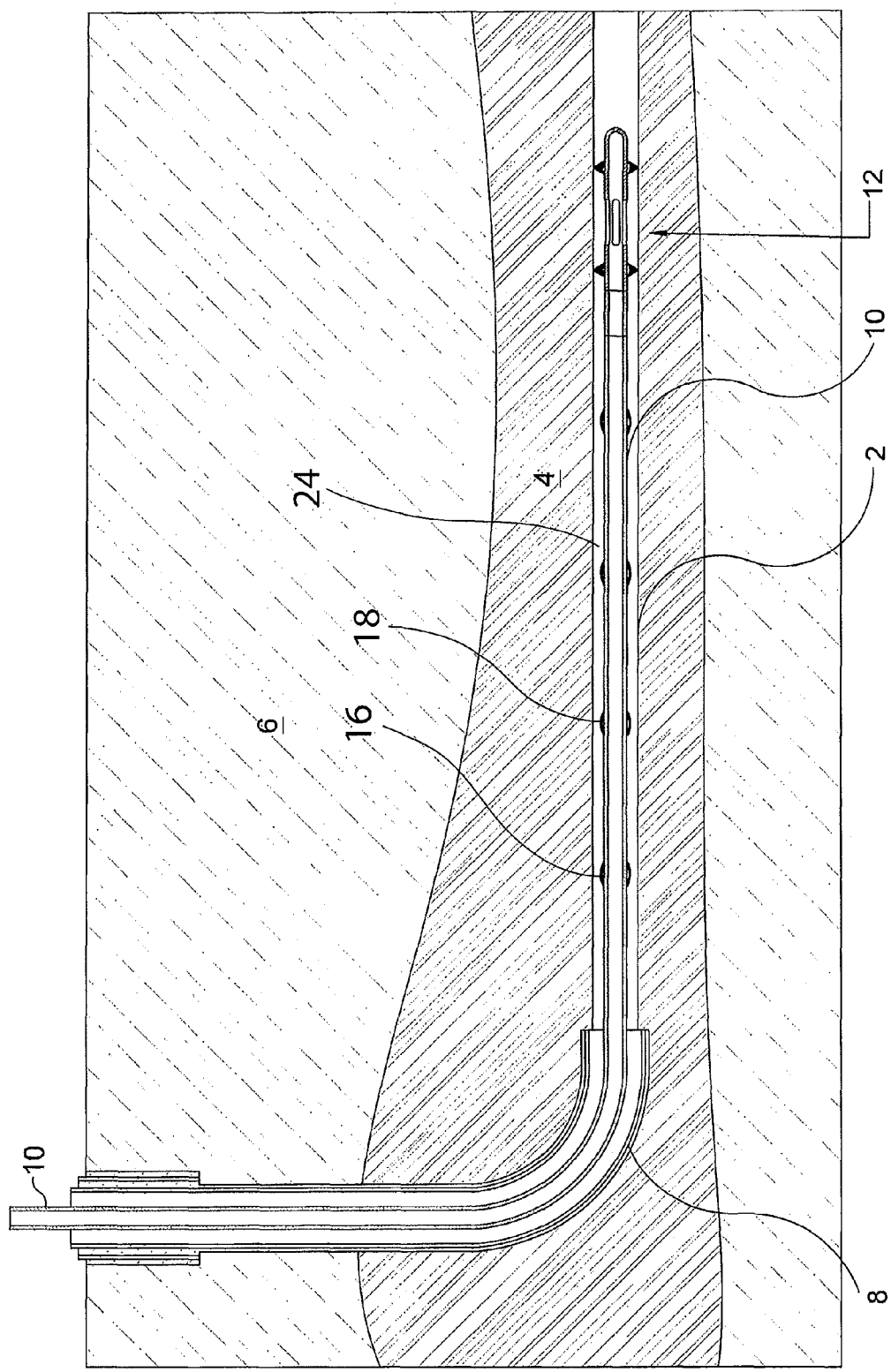
FIG. 3 is a schematic cross-section of one or more embodiments of an apparatus and method according to this invention.
Figure 4:
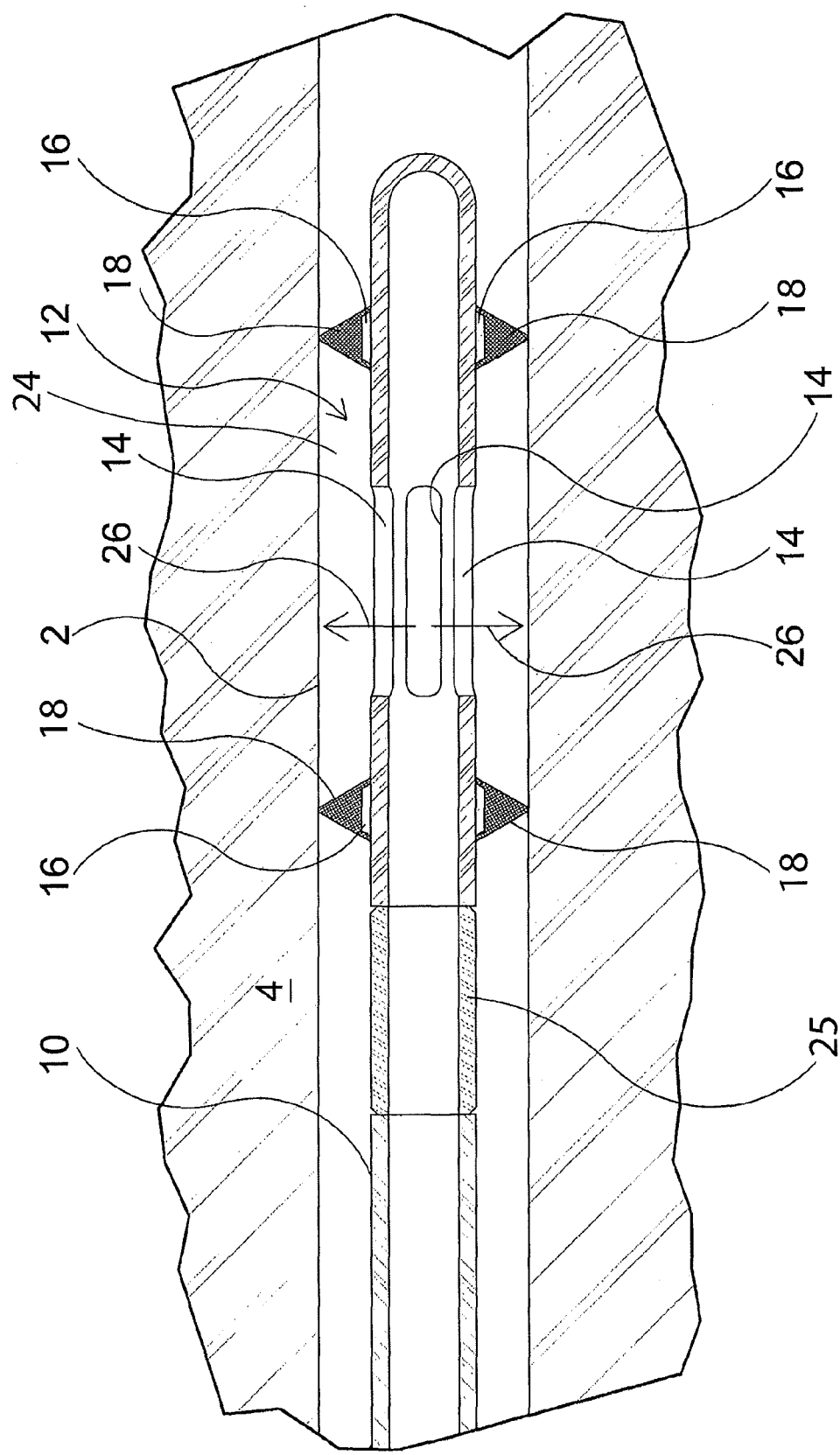
FIG. 4 is an enlarged diagram of tool 12 of FIG. 3.

In operation, the tool 12 is positioned such that the rings 18 straddle the zone that is to be treated. Referring to FIGS. 3 and 4, the coils 16 are then energized and act as electromagnets and induce a magnetic field in the vicinity of the coils 16, including in the fluid 20. The magnetic field causes the fluid 20 to viscosify as the iron particles align in the direction of magnetic flux lines in the magnetic field. The shape of the rings 18 change with the alignment of the iron particles such that the rings 18 expand in a direction transverse to the longitudinal direction of the wellbore to form packer-like isolators 18 which close off the annulus 24 between the the ring/isolators 18. A well treatment fluid 26 such as a fracturing fluid can then be pumped the ring/isolators 18. A well treatment fluid 26 such as a fracturing fluid can then be pumped out of the coiled tubing 10 though the slots 14 into the isolated annulus 24.

After completion of the well treatment, the electricity being supplied to the coils 16 is switched off and the fluid 20 loses high viscosity. As the fluid 20 losses high viscosity, the rings 18 become malleable once again such that the rings 18 can be pulled away from the side of the wellbore 2 and the tool 12 can be moved to another interval or zone for well treatment.

Figure 5:
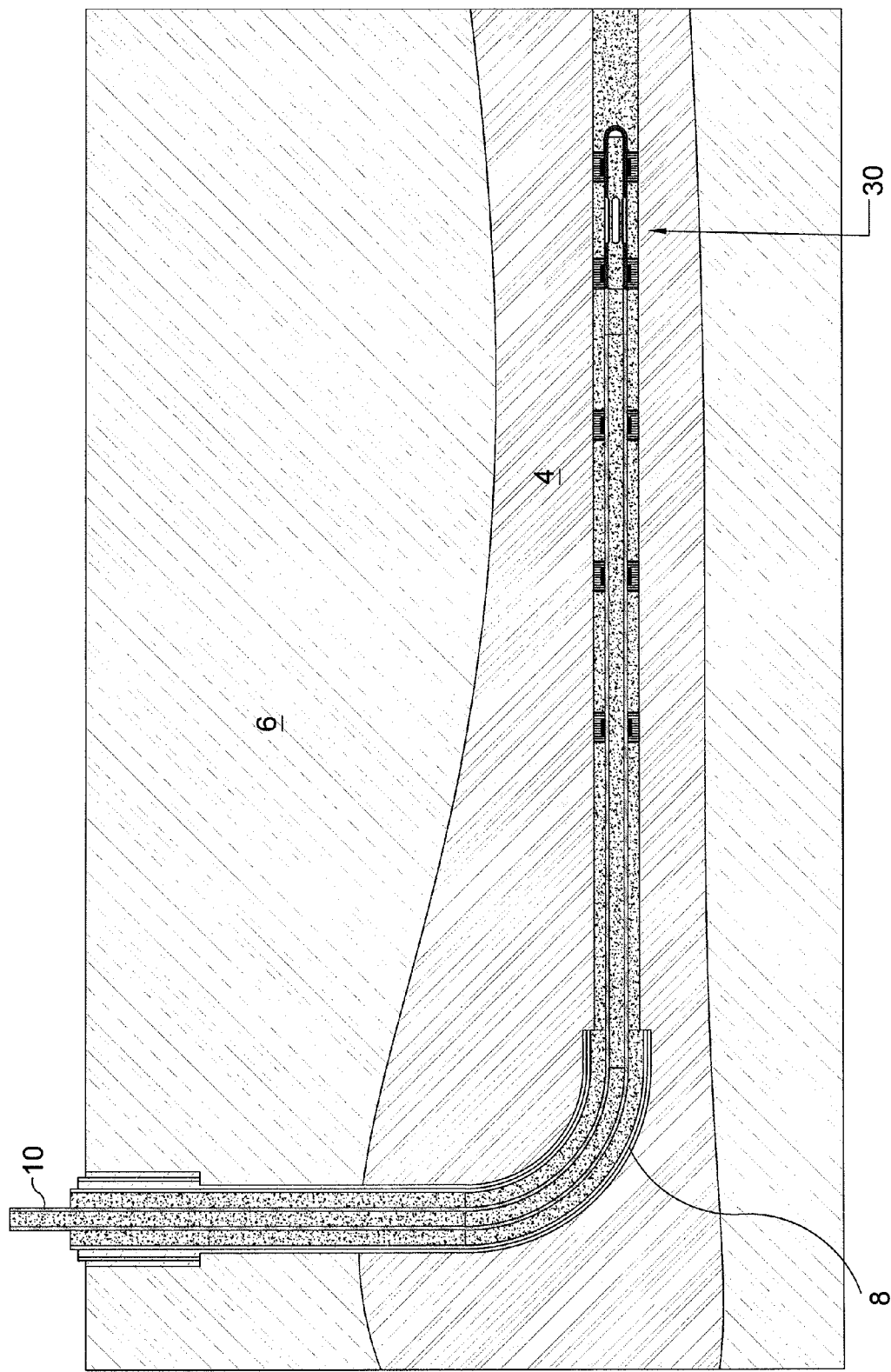
FIG. 5 is a schematic cross-section of one or more embodiments of an apparatus and method according to this invention.
Figure 6:
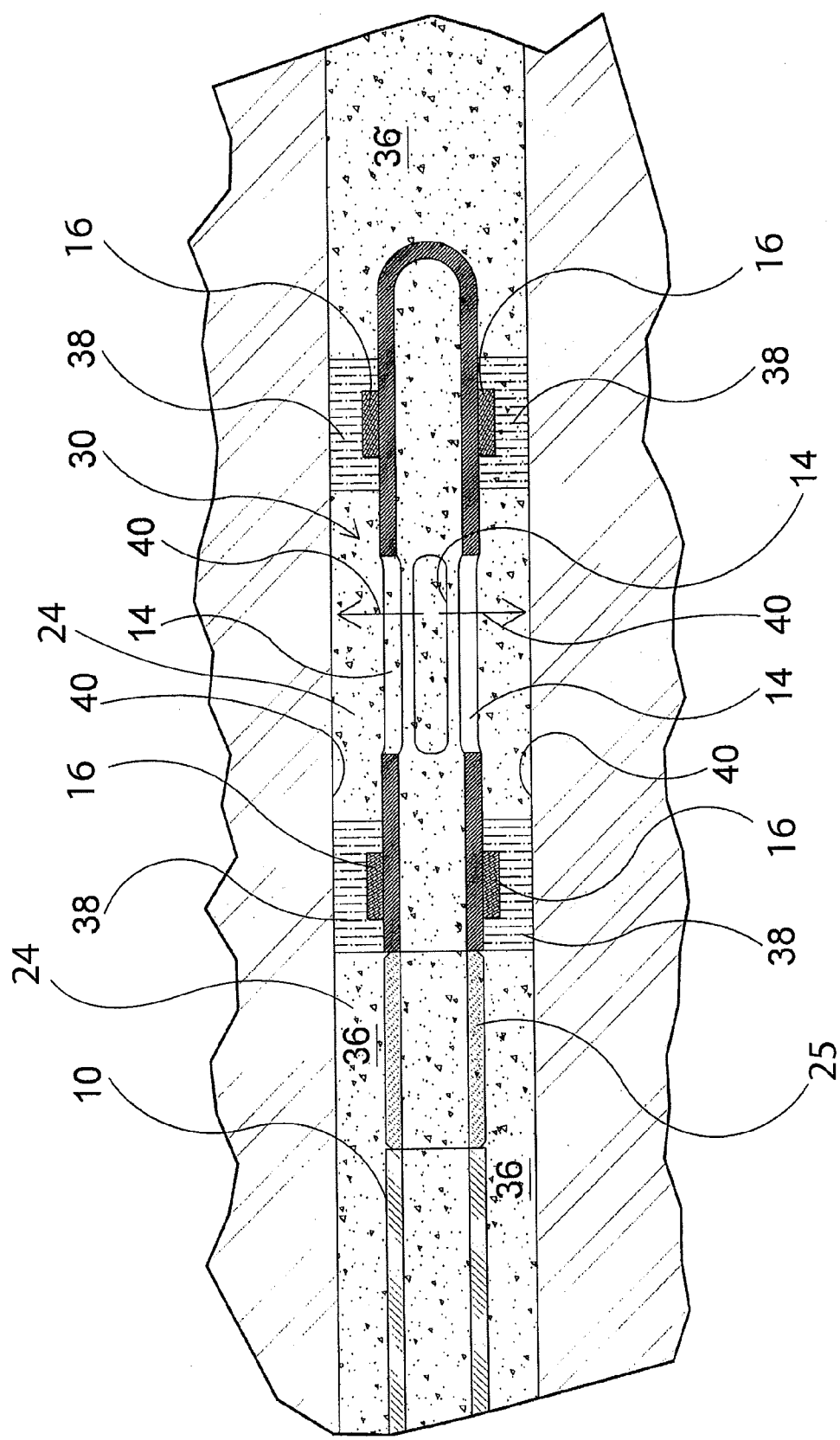
FIG. 6 is an enlarged diagram of tool 30 of FIG. 5.

Referring to FIGS. 5 and 6, in one or more embodiments of this invention, an electromagnetic fracturing tool 30 is provided which is similar to the tool 12. Unlike tool 12, however, the tool 30 does not have a malleable ring (18) containing a magnetorheological fluid which encircles the electromagnetic coils 16. The coils 16 are operably connected to a downhole power generator 25 which provides electricity to energize the coils 16.

In operation, the tool 30 is positioned such that the coils 16 straddle the zone that is to be treated. A magnetorheological fluid 36 comprising iron particles is introduced into the annulus 24 sufficient to at least fill the annular space between the tool 30 and the side of the formation 40 in the vicinity of the coils 16. The coils 162 are then energized and act as electromagnets and induce a magnetic field in the fluid 36. The magnetic field causes the fluid 36 to viscosify as the iron particles align in the direction of magnetic flux lines in the magnetic field. The fluid 36 becomes sufficiently viscous and even solid such that it forms plugs 38 which closes off the annulus on either side of the slots 14 in the tool 30. A well treatment fluid 40 such as a fracturing fluid can then be pumped out of the coiled tubing 10 though the slots 14 into the isolated annulus 24. After completion of the well treatment, the electricity being supplied to the coils 32 is switched off and the plugs 38 loses their high viscosity. As the plugs 38 lose their viscosity, the plugs 38 no longer close off the annulus 24 and the tool 30 can be moved to another interval or zone for well treatment.

Figure 7:
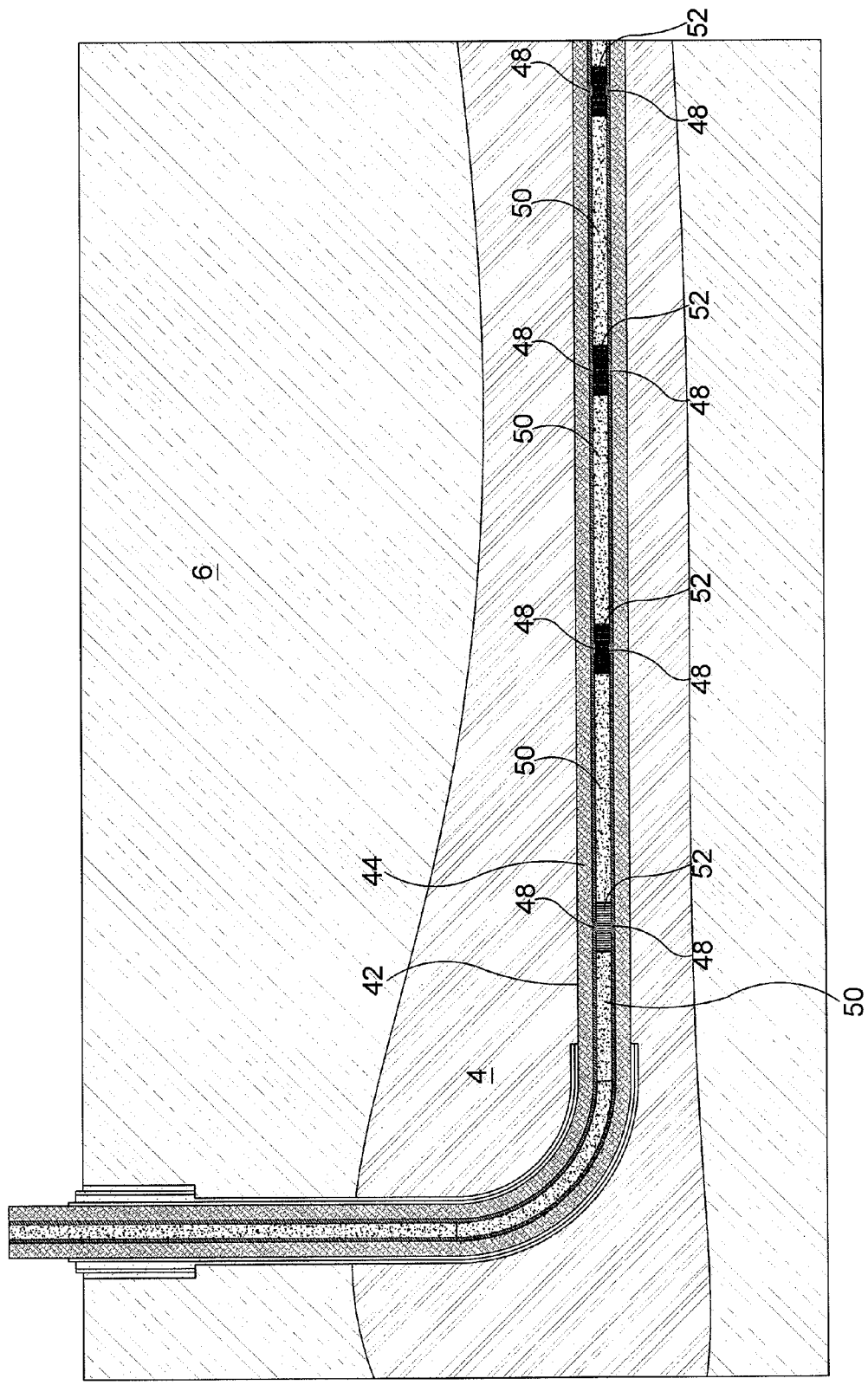
FIG. 7 is a schematic cross-section of one or more embodiments of an apparatus and method according to this invention.
Figure 8:
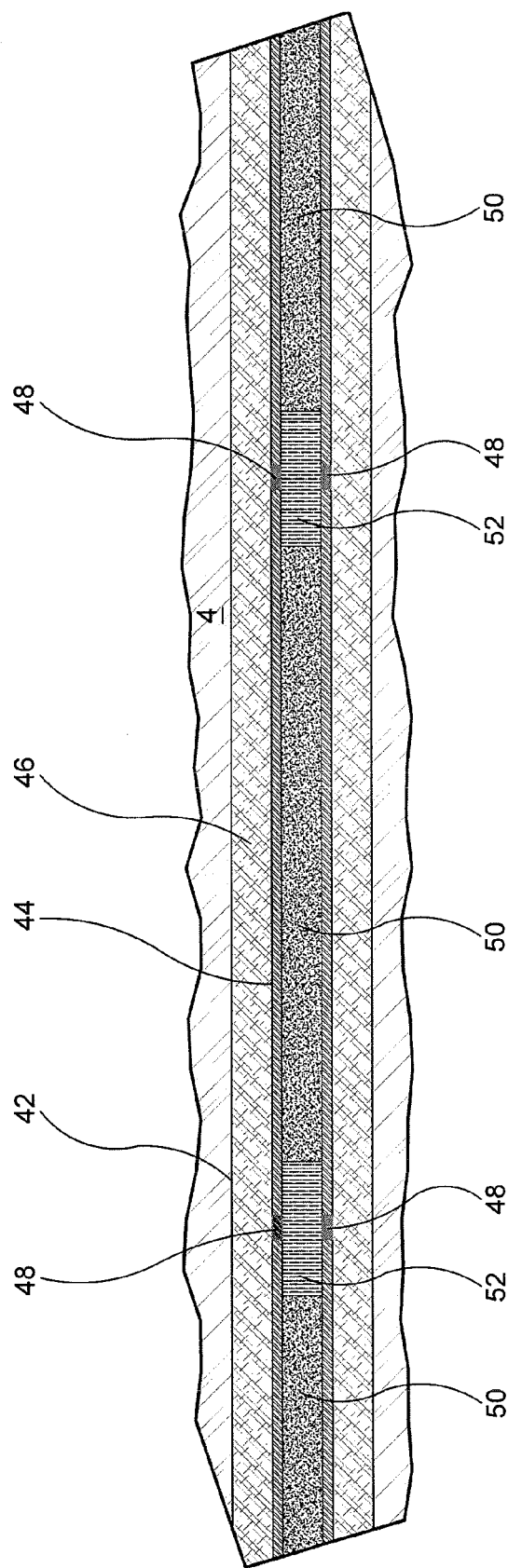
FIG. 8 is an enlarged diagram of a section of FIG. 7.

Referring to FIGS. 7 and 8, in one or more embodiments of this invention, a wellbore 42 is lined with a casing 44 which is cemented into place with cement 46. Electromagnetic coils 48 are located at intervals in the casing 44. The coils 48 are electrically connected by wireline or other suitable means to a generator (not shown) which would typically be at the surface. A magnetorheological fluid 50 comprising iron particles is pumped to fill the casing 44 in the zones where isolation is required. One or more of the coils 48 are then energized and act as electromagnets and induce a magnetic field in the vicinity of the coils 48, including in the fluid 50. The magnetic field causes the fluid 50 to viscosify as the iron particles align in the direction of magnetic flux lines in the magnetic field forming plugs 52. The plugs 52 close off the wellbore. The plugs 52 can be formed and reformed at the same time or in any desired sequence by turning the power to one or more of the coils 48 off and on. A well treatment fluid such as a fracturing fluid can be introduced when desired and can be diverted by one or more of the plugs 52.

The electromagnets according to this invention can be powered by a downhole dynamo that is energized by pumping the treatment fluid through its inner passage. The electromagnets can also be powered by downhole batteries and be switched by fluid flow and or pressure. The electromagnets can also be powered by downhole batteries and be switched by a signal from surface.

In one or more embodiments of the invention, an MR fluid is injected into casing or tubing. One or more coils are attached to the casing or tubing at desirable distance. The magnetic field at the designated locations is initiated simultaneously with pumping of the fracturing fluid. MR fluid in strong magnetic field, i.e., near the coils, is transformed into semi-solid while MR fluid in weak field, i.e., far from the coils, has lower viscosity. The vast viscosity contrast of the MR fluid in casing or tubing diverts the fracturing fluid to the desirable zones. In this application the MR fluid can be gelled, for example, by adding into the oil medium gellants known in the art. Gelled MR fluid can fill the tubing space more efficiently.

In one or more embodiments of the invention, an MR fluid is injected into casing or tubing or wellbore. Instead one or more coils are attached to the coil tubing, which is used to deliver the fracturing fluid to the formation. The magnetic field at the designated locations is initiated simultaneously with pumping of the fracturing fluid. MR fluid in strong magnetic field, i.e., near the coils, is transformed into semi-solid while MR fluid in weak filed, i.e., far from the coils, has lower viscosity. The vast viscosity contrast of the MR fluid in casing or tubing diverts the fracturing fluid to the desirable zones. In this application the MR fluid can be gelled, for example, by adding into the oil medium gellants known in the art. A gelled MR fluid can fill the tubing space more efficiently.

We claim:

1. A method of hydraulic fracturing, the method comprising the following steps:
    (a) providing a work string comprising a well treatment tool at an end of the string, the tool comprising an electromagnet;
    (b) inserting the tool into a wellbore in a subterranean formation to a first target zone;
    (c) injecting a magnetorheological fluid into the wellbore via the string;
    (d) inducing a magnetic field with the electromagnet in the magnetorheological fluid in the wellbore;
        wherein, the magnetic field increases the viscosity of the magnetorheological fluid located in close proximity to the electromagnet, transforming the magnetorheological fluid into a semi-solid or solid;
    (e) conducting a fracturing treatment by injecting a fracturing fluid into the wellbore at a pressure sufficient to fracture the formation;
        wherein, the semi-solid or solid magnetorheological fluid diverts the fracturing fluid to the target zone;
    (f) after the fracturing treatment, turning off the electromagnetic field;
    (g) moving the work string along the wellbore to a second target zone;
    (h) repeating steps (d), (e) and (f) for fracturing the formation at the second target zone; and
    (j) repeating steps (d), (e), (f) and (g) successively for each additional target zone to be isolated and fractured.

2. The method of claim 1 further comprising stopping the injection of the magnetorheological fluid prior to inducing the magnetic field.

3. The method of claim 1, wherein the magnetorheological fluid is injected in an annulus between the wellbore and the work string.

4. The method of claim 1, wherein the magnetorheological fluid comprises ferromagnetic particles.

5. The method of claim 4, wherein the magnetorheological fluid further comprises non-ferromagnetic particles.

6. A method of hydraulically fracturing a subterranean formation comprising:
providing a work string comprising a well treatment tool at an end of the string, the tool comprising first and second electromagnetic coils encircling the tool;
inserting the tool into a wellbore in the subterranean formation, wherein the first and second electromagnetic coils straddle a target zone;
injecting a magnetorheological fluid into the wellbore via the work string;
inducing a magnetic field with the electromagnetic coils, wherein the magnetic field increases the viscosity of the magnetorheological fluid located in close proximity to the first and second electromagnet coils, transforming the magnetorheological fluid into a semi-solid or solid plug located at each of the first and second electromagnet coils for straddling the target zone; and
injecting a well treatment fluid into the wellbore at a pressure sufficient to fracture the formation at the target zone;
wherein, the semi-solid or solid magnetorheological fluid diverts the well treatment fluid to the target zone.

7. The method of claim 6, wherein the tool further comprises malleable rings encircling the first and second electromagnetic coils
the malleable rings comprising the magnetorheological fluid; and
wherein the step of inducing a magnetic field with the electromagnetic coils causes the malleable rings to expand and form isolators.

8. The method of claim 6, wherein the wellbore is a horizontal wellbore.

9. The method of claim 8, wherein the formation has multiple target zones and
wherein the method comprises a multi-stage fracturing operation for successively fracturing the multiple target zones comprising the following steps:
after a first fracturing treatment, turning off the magnetic field;
moving the work string along the wellbore such that the first and second electromagnetic coils straddle a second target zone;
inducing a magnetic field with the electromagnetic coils, wherein the magnetic field increases the viscosity of the magnetorheological fluid located in close proximity to the first and second electromagnet coils, transforming the magnetorheological fluid into a semi-solid or solid plug located at the first and second electromagnetic coils and thus straddling the second target zone; and
injecting a well treatment fluid into the wellbore at a pressure differential sufficient to fracture the formation at the second target zone,
wherein, the semi-solid or solid magnetorheological fluid diverts the well treatment fluid to the second target zone; and
repeating the steps successively for each additional target zone to be isolated and fractured.

10. The method of claim 6 further comprising stopping the injection of the magnetorheological fluid prior to inducing the magnetic field.

11. The method of claim 6, wherein the magnetorheological fluid is injected in an annulus between the wellbore and the work string.

12. The method of claim 6, wherein the magnetorheological fluid comprises ferromagnetic particles.

13. The method of claim 12, wherein the magnetorheological fluid further comprises non-ferromagnetic particles.

* * * * *